Figure 1:
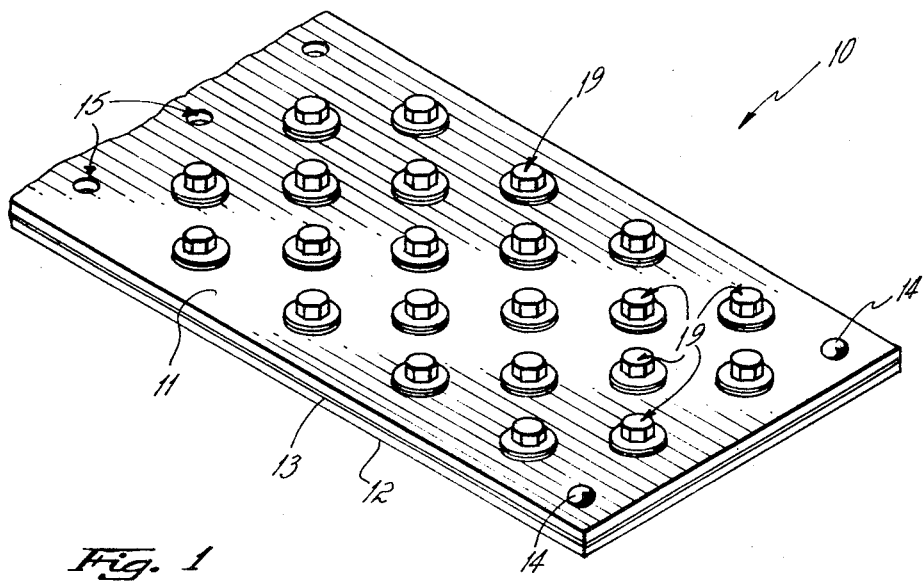

United States Patent

Kruer

[15] 3,636,415
[45] Jan. 18, 1972

[54] MOUNTING ASSEMBLY FOR RECTIFIERS

[72] Inventor: Harold H. Kruer, Ft. Mitchell, Ky.
[73] Assignee: Teledyne Mid-America Corporation, Los Angeles, Calif.
[22] Filed: Apr. 14, 1971
[21] Appl. No.: 133,821

[52] U.S. Cl............................................317/234, 317/101
[51] Int. Cl..............................................H01l 1/12, H01l 1/16
[58] Field of Search....................317/234, 234 B, 234 A, 233

[56] References Cited

UNITED STATES PATENTS

| | | | |
|---|---|---|---|
| 2,215,667 | 9/1940 | Sherman | 317/234 |
| 2,676,288 | 4/1954 | Riley | 317/234 |
| 2,738,452 | 3/1956 | Martin | 317/234 |
| 2,992,372 | 7/1961 | Himeon et al. | 317/234 |
| 3,023,346 | 2/1962 | Wagner | 317/234 |
| 3,210,619 | 10/1965 | Kupferberg et al. | 317/234 |

Primary Examiner—James D. Kallam
Attorney—Wood, Herron & Evans

[57] ABSTRACT

An assembly for mounting a plurality of rectifiers to a pair of current conductors. The conductors are two overlying plates, separated by a layer or sheet of insulation between their inner faces. Each rectifier is a high-current device in the form of an annular washer, and is mounted to an outer face of one of the conductors. The mounting means is a fastener having a shank which passes through one or a stack of the washer rectifiers, into an aperture extending perpendicularly to the conductors. The shank of the fastener is insulated from the conductor against which the rectifier is held, but is in electrical contact with the other conductor and is secured relative to both. A head or nut on the fastener exerts mechanical force on, and is in electrical contact with, the upper surface of the rectifier. The rectifying circuit includes the shank of the fastener.

11 Claims, 2 Drawing Figures

PATENTED JAN 18 1972

3,636,415

INVENTOR.
Harold H. Kruer
BY
Wood, Herron and Evans
ATTORNEYS

MOUNTING ASSEMBLY FOR RECTIFIERS

This invention relates to a rectifier assembly which is especially suited for mounting a large plurality of individual rectifiers to current conductors.

The invention finds particular utility in the fabrication of high-amperage, low-voltage rectifying circuits of the type used in welding equipment. While not inherently so limited, the invention is explained hereinafter primarily in relation to such use.

Where currents of very high amperage, for example of the order of 100,000 amperes, are rectified, a large plurality of rectifiers is usually used for the purpose. There are, of course, limits on the current-handling capability of a single rectifier which such high currents would far exceed. Hence the current is divided and rectified in plural rectifying branch circuits so that no single rectifier exceeds its proper operating current range. For the standard present rectifiers, current limits are commonly about 500–1,000 amperes, and it is thus apparent that to handle a total current load of 50,000 to 100,000 amperes, anywhere from 50 to 100 rectifiers in parallel would be provided.

In such use rectifiers are conventionally mounted to provide parallel flow paths between the conductors. For that purpose there are presently available clamps which exert a holding force on each rectifier to insure good electrical contact.

Such rectifier holding and clamping means are relatively expensive; and where a large number of them must be used, they substantially increase the overall cost of the rectifying assembly. Moreover, they are relatively bulky and require an unduly large volume of space.

It is the purpose of this invention to provide a simplified form of rectifier mounting means, compact in size and economical to fabricate, and quickly attachable, which can accommodate as many parallel rectifying circuits as are desired for a particular installation.

In the present invention the current carrying electrodes comprise a pair of conductive plates, in overlapping or superimposed relation, with insulating means between them. The insulating means may comprise an airgap, but is preferably a sheet or layer of dielectric material. The conductor plates act as bus bars for carrying the heavy current to and from the rectifiers, to be described, in which the current is converted to pulsating direct current. They also function as heat sinks. Channels can be provided for coolant flow in one or the other of the conductor plates, or in the insulation or gasket between them.

The individual rectifiers are in the form of annular washers through which the current passes generally perpendicularly, from one large surface to the other. Each washer rectifier has a central hole through which passes a combination current carrier and fastener. The fasteners may take a number of forms, as will become apparent.

The conductor plates are preferably formed as a standardized subassembly with mounting sites for accommodating a large number of rectifiers, as may be needed.

The fasteners provide both an electrical connection to the rectifier, and mechanical connection of the plates. In preferred form it comprises a bolt which is threaded into one plate. At each rectifier mounting position an aperture is provided in the conductor plate subassembly, perpendicular to the surface thereof. The fastener passes through the hole in the washer rectifier and through the aperture in one plate, against which it holds the rectifier. The shank of the fastener is insulated from this plate, to preclude current bypassing of the rectifier, but is in electrical contact with the second conductor plate, i.e., the other plate than that on which the rectifier resides. The shank of the fastener may be threaded into the aperture in the second rectifier plate, or fastened by a nut on the other side of the second plate.

As previously stated, the fastener is a current carrying element of the circuit. It provides the flow path between the second plate (the other plate than that on which the rectifier resides), and one surface of the rectifier. The other surface of the rectifier is connected to the first plate. Thus current passes between the first conductor plate, the rectifier, the shank of the fastener, and the second conductor plate.

Rectifying devices in the form of annular washers have previously been described, as shown in the U.S. Pats. to Dooley, No. 1,748,012; Ruben No. 1,865,213; Ray No. 2,383,735; Tumulo No. 2,637,771; Burton No. 2,751,528; and Howard No. 3,235,783. Bolts passing through apertures in such rectifier washers have previously been used mechanically to clamp the rectifiers together in electrical contact with one another, or between spaced mounts.

This invention differs from the prior constructions in that here the fasteners constitute not only the mechanical mounting means for the rectifiers, but also comprise an integral central part of the electrical current path between the conductor plates. Moreover, in this invention, the conductor plates are facially juxtaposed, and constitute a multiply apertured, preformed subassembly for the mounting of a plurality of rectifiers directly on a single exposed surface thereof. This is a distinct advantage in terms of ease of mounting, cost, size, and adaptability for accommodating various numbers of rectifiers.

The chemical nature of suitable rectifying components is well known in the art, and does not form a part of this invention. By way of example, known rectifier materials include the conventional silicon and germanium, as well as the older copper oxide rectifiers. Silicon rectifiers are most commonly used for high current installations.

Figure 2:
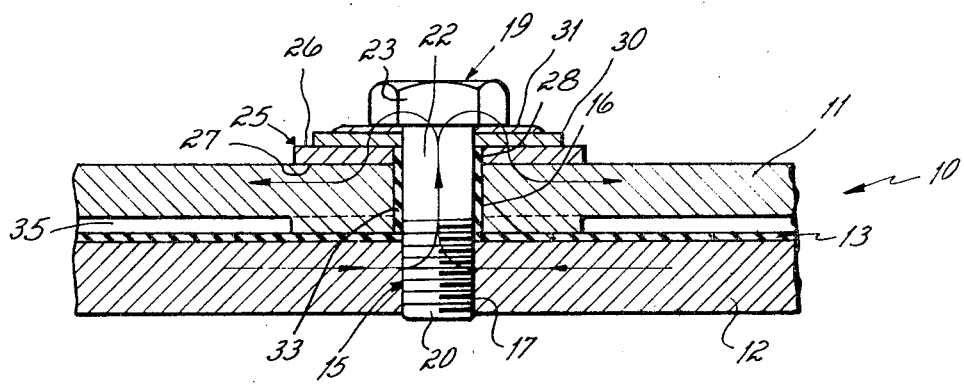

The invention can best be further explained in relation to the accompanying drawings in which:

FIG. 1 is a view in perspective of a preferred form of rectifier assembly in accordance with the invention, showing a large number of rectifier washers mounted to a preformed conductor plate subassembly; and FIG. 2 is an axial vertical section through a single rectifier as shown in FIG. 1, showing a current flow path in diagrammatic form.

The conductor plate subassembly is designated at 10 in FIGS. 1 and 2, and in preferred embodiment comprises two large flat rectangular copper plates, a first or upper plate 11 and a second or lower plate 12. These plates may be coextensive in area as shown, or may overlay partially, and they are connected to a source of potential by suitable means not shown. These plates are sized in cross-sectional area to carry currents of the largest magnitude which is likely to be encountered.

The FIG. 2 it can be seen that insulating means in the form of a dielectric sheet 13 is interposed between plates 11 and 12, to prevent current short circuiting between them which would bypass the rectifiers to be described. If voltages involved are not high, for example, if they are of the magnitudes involved in welding circuits, this insulation may, for example, comprise a sheet of cork. As will be seen, this layer may also function as a gasket for the coolant.

Nonconductive rivets or other fasteners 15 may be provided to hold the plates 11 and 12 together, pending insertion of the rectifier fasteners.

A number of apertures 15 are spaced in a regular pattern over the upper face of plate subassembly 10. Each aperture 15 passes entirely through the upper plate 11, and preferably extends at least part way into lower plate 12, sufficiently that the fastener may be mechanically secured to it as by threads. In the preferred embodiment shown, the upper plate 11 has an aperture 16 which is of larger diameter than the aperture 17 in the lower plate 12, and the latter aperture extends entirely through the lower plate. The portion 17 of the aperture in lower plate 12 is threaded to engage threads 20 on a fastener designated generally at 19.

The fastener 19 is shown for purposes of illustration as a bolt. It comprises a shank portion 22 and an enlarged head portion 23. The fastener 19 is a current-conducting component of the assembly, and for that purpose may be made of copper. The mechanical load on it is usually not severe, as will appear.

Each bolt 19 fastens one or a stack of rectifiers 25 to the conductor plate assembly 10. Each rectifier 25 is in the form of a flat annular washer having an upper surface 26 and a lower surface 27. One of these surfaces is a rectifying surface, for example copper oxide, such that current flowing from one surface 26 or 27 to the other surface 27 or 26 is rectified. The washer rectifier 25 has a hole 28 formed centrally in it, through which the shank 22 of fastener 19 extends. It is the function of each fastener 19 when threaded into mechanical engagement with one of the conductor plates 11 or 12, to hold the rectifier 25 in electrical contact with the upper conductor plate 11, by exerting a compression force thereon. It is also the function of the fastener to provide a current path through the hole 28 in the rectifier, through (but not to) aperture 16 in the first plate 11, to second plate 12. The fastener 19 may also, and preferably does, mechanically connect the two plates 11 and 12. In the embodiment shown, the fastener is in electrical contact with only the top surface 26 of rectifier 25 and the second plate 12, and is insulated from the hole 28 in the rectifier and the aperture 16 in the first plate 11.

For the purpose of providing good electrical contact, and avoiding torque damage to the rectifier, a contact washer 30 may overlie the upper surface 26 of the rectifier 25, and a spring washer 31 may be used between the head 23 of fastener 19 and contact washer 30.

It is important to note that an insulating layer or sheath 33 resides in aperture 16 in the first plate 11, to prevent flow of current directly from fastener shank 22 to that conductor plate, which would bypass the rectifier. For this reason aperture 16 is sized to accommodate this sheath 33, see FIG. 2. For low-voltage installations, this insulator 33 may comprise a vinyl coating in aperture 16 or on the external surface of fastener 19 in the axial region within aperture 16, or it may simply comprise a short length of tubing of insulating material which is disposed within the aperture but not physically integral with it or the fastener. It extends to sheet 13 at its lower end, and projects above the top surface of plate 11, through the hole 28 in the rectifier washer to the upper surface 26 of the latter.

The arrows in FIG. 2 illustrate in diagrammatic form a current flow path from lower plate 12 through threads 20 into the shank 22 of the fastener 19, upwardly through the shank and into the head 23 thereof, outwardly and downwardly through the spring washer 31, the contact washer 30, through the rectifying surfaces 26 and 27, and into the upper plate 11. (Depending on circumstances, current flow may be in the reverse direction, and it will be appreciated that the path shown is for purposes of explanation only).

From the foregoing, those skilled in the art will recognize that the fastener 19, the contact and spring washers 30 and 31, if such are used, should be sized to accommodate the current densities which they will pass in use.

In the embodiment shown, only a single rectifier 25 is mounted by each fastener 19. In some cases (depending on the voltages involved and the voltage limits of the rectifiers), a stack of several rectifier washers may be mounted by each fastener. In this case the fastener head 23 contacts the uppermost rectifier and the shank is insulated from the lower rectifiers in the stack, to prevent shorting.

Where it is desirable to provide cooling to minimize the temperature rise in operating a large bank of rectifiers, coolant channels 35 can be provided. As shown in FIG. 2, these channels are conveniently formed as grooves in one of the conductor plates 11 or 12, which is closed by a cover. The cover may conveniently be the insulating sheet 13. Alternatively, coolant channels may be formed within the sheet 13. The channels trace a sinuous coolant course between the apertures 15.

In practice standardized conductor plate subassemblies 10 with apertures 15 performed in them can be carried as stock items by the manufacturer of welding equipment. The plates are held together by the rivets 14, until further united by the installation of the fasteners. Rectifiers can then be fastened at as many mounting positions on the assembly 10 as are needed for a given installation. The rectifiers can be mounted rapidly, simply by placing the desired number of rectifiers on the shank of a fastener with the spring washer 31 and contact washer 30 first placed thereon, fitting a sheath 33 into the hole 28 within the washer, and securing and tightening these components in apertures 16 and 17. Depending on current requirements, not all of the apertures 15 provided on the subassembly 10 may be fitted with rectifiers (note the unused apertures in FIG. 1). A housing to prevent shock, mechanical damage, accumulation of dirt and so on will usually be provided over the assembly.

In the foregoing explanation the fastener 19 has been described as a bolt threaded into the second plate, and having an integral head exerting force on the rectifier. It will be apparent that other combined mechanical fastening and electrical connecting means may be used. For example, an upwardly projecting stud threaded into the second plate may have a nut on its upper or free end to exert the holding force on the rectifier. Alternately, a bolt passing through both plates may have a nut threaded to it on either end to provide the desired force on the rectifier, electrical contact being made between the bolt and the second plate.

Having described the invention, what is claimed is:

1. A rectifier assembly comprising,
   a first conductor plate facially overlying a second conductor plate but electrically insulated from second plate by an insulator between them,
   an aperture extending through said first plate,
   a rectifier having parallel opposed first and second surfaces and adapted to rectify alternating current flowing from one said surface to the other,
   said rectifier disposed with one of its said surfaces in electrical contact with the outer face of said first plate,
   said rectifier having a hole therethrough perpendicular to its said surfaces, said hole being in line with said aperture,
   a rectifier fastener having a shank extending through the hole in the rectifier and through the aperture in the first plate, said fastener making an electrical contact with said second plate through said shank,
   said fastener including a portion mechanically engaging one of said plates to prevent axial movement with respect thereto,
   said fastener also having means connected to said shank, outwardly of said rectifier which exerts an axial compression force holding said rectifier in physical and electrical engagement with the outer face of said first plate,
   and insulating means around and within the aperture through said first plate, said insulating means electrically insulating said first plate but not said second plate from the shank of said fastener, such that current can flow between said plates only by passing through both said rectifier and the shank of said fastener.

2. The assembly of claim 1 wherein said fastener is a bolt having threads on the shank thereof which are engaged with cooperating threads on one of said plates.

3. The assembly of claim 1 wherein said aperture extends at least part way into said second plate, and the shank of said fastener extends thereinto and is secured mechanically to said second plate.

4. The assembly of claim 3 wherein said fastener comprises a bolt having threads engaged with the aperture in said second plate and thereby holds said plates together and said rectifier to said plates.

5. The assembly of claim 1 wherein the insulating means around and within said aperture through the first plate comprises a layer of insulation extending from the inner face of the first plate through the aperture in the first plate to the outer face thereof.

6. The assembly of claim 1 wherein said insulating means around the aperture extends around the shank of said fastener, through the hole in said rectifier.

7. The assembly of claim 1 wherein said first and second plates are held in the overlying relation by nonconducting securing means, in addition to said fastener.

8. The assembly of claim 1 wherein a plurality of such apertures are formed in spaced array over the face of said first plate, and where fasteners of the type described mount rectifiers of the type described in some but not all of the said apertures.

9. A rectifier assembly comprising,
- a first conductor plate facially overlying a second conductor plate but electrically insulated and spaced from said second plate by a sheet of insulation between them,
- an aperture extending through said first and second plates and said sheet of insulation,
- a washer rectifier having parallel opposed surfaces and adapted to rectify alternating current flowing from one of said surfaces to the other,
- said rectifier disposed with one of its aid surfaces in electrical contact with the outer face of said first plate,
- said rectifier having a hole therethrough perpendicular to its said surfaces, and which is in line with said aperture,
- a current conductive bolt having a shank and a head, said shank extending through the hole in the rectifier, through the aperture in the first plate and sheet and threaded into the aperture in said second plate,
- the head of said bolt exerting a compression force holding said rectifier in secure physical and electrical engagement with the outer face of said first plate, said bolt also holding said first plate in fixed relation to said second plate,
- and insulating means within the aperture through said first plate, said insulating means electrically insulating said first plate but not said second plate from the shank of said bolt such that current can flow between said plates only by passing through bolt said rectifier and the shank of said securing means.

10. The rectifier assembly of claim 9 wherein the insulating means within the aperture in the first plate comprises a tube of insulating material around the shank of said bolt.

11. The rectifier assembly of claim 10 wherein the aperture within said first plate is oversized with respect to the aperture in the second plate, to accommodate said tube.

* * * * *